US012113294B2

(12) United States Patent
Kausar et al.

(10) Patent No.: US 12,113,294 B2
(45) Date of Patent: Oct. 8, 2024

(54) RECONFIGURABLE ANTENNA

(71) Applicant: BOISE STATE UNIVERSITY, Boise, ID (US)

(72) Inventors: Shafaq Kausar, Boise, ID (US); Hani Mehrpouyan, Boise, ID (US)

(73) Assignee: Boise State University, Bosie, ID (US)

(*) Notice: Subject to any disclaimer, the term of this patent is extended or adjusted under 35 U.S.C. 154(b) by 402 days.

(21) Appl. No.: 17/528,058

(22) Filed: Nov. 16, 2021

(65) Prior Publication Data

US 2022/0158342 A1 May 19, 2022

Related U.S. Application Data

(60) Provisional application No. 63/114,183, filed on Nov. 16, 2020.

(51) Int. Cl.

*H01Q 3/24* (2006.01)
*H01Q 3/08* (2006.01)
*H01Q 21/06* (2006.01)

(52) U.S. Cl.

CPC ................. *H01Q 3/24* (2013.01); *H01Q 3/08* (2013.01); *H01Q 21/065* (2013.01)

(58) Field of Classification Search

CPC ........... H01Q 15/0086; H01Q 21/0018; H01Q 21/065; H01Q 21/28; H01Q 25/00; H01Q 3/08; H01Q 3/18; H01Q 3/24

See application file for complete search history.

(56) References Cited

U.S. PATENT DOCUMENTS

2020/0412014 A1* 12/2020 Chen ........................ H01Q 1/38
2022/0115779 A1* 4/2022 Gershenzon ............. H01Q 3/18

* cited by examiner

*Primary Examiner* — Timothy X Pham

(74) *Attorney, Agent, or Firm* — Parsons Behle & Latimer

(57) ABSTRACT

A system may include a meta-surface including multiple unit cells arranged along the meta-surface. Structural parameters of each unit cell may vary along the meta-surface. The system may further include at least a first active feed unit directed toward the meta-surface to generate a first beam. The first active feed unit may be configured to move relative to the meta-surface parallel to a 2-dimensional plane. The first beam is steerable by moving the first active feed unit.

20 Claims, 12 Drawing Sheets

RECONFIGURABLE ANTENNA

CROSS-REFERENCE TO RELATED APPLICATIONS

This application claims the benefit of, U.S. Provisional Patent Application No. 63/114,183, filed on Nov. 16, 2020, and entitled "High Gain Dual Beam Reconfigurable Antenna for Millimetric Wave Communication," the contents of which are incorporated by reference herein in their entirety.

FIELD OF THE DISCLOSURE

This disclosure is generally related to the field of reconfigurable antennas and, in particular, to a reconfigurable antenna having a movable feed unit.

BACKGROUND

High gain beam steering antennas may be useful for low earth orbit satellite communication and millimeter wave (mmWave) 5G communication systems. Next generation satellite communication and emerging mmWave wireless communication may boost communication network performance by providing high speed and low latency links. This may result in a compact, low cost, and compact user experience.

High gain beam steering antennas can benefit communication systems in various ways. For example, satellite communication typically involves relative motion between satellites and ground terminals. Adjusting an antenna beam to compensate for the satellite motion maintains the communication link. Similarly, in terrestrial communication, such as emerging mmWave communication, high gain reconfigurable antennas may be able to provide high signal strength over long distances. Due to beam agility, reconfigurable antennas can compensate for changes in the position of a user in the network and can provide gain diversity.

In recent years there has been increasing interest in employing phased array antennas in various wireless applications including satellite communications, radars, imaging systems and airborne platforms. In phased array antennas, individual antenna elements may have a phase shifter and an associated feed distribution network. The feed network and its associated electronics tend to be complex, impacting the overall cost and efficiency of the communication system.

Beam scanning transmit array antennas have been considered as a promising candidate to implement cost effective phased arrays. Beam-steering approaches in existing reconfigurable transmit arrays can be categorized into feed switching techniques, element tuning techniques, and aperture tilting techniques. In the feed switching techniques, multiple feed antennas are placed over the reflecting or transmitting aperture and a spatial delay profile over the aperture can be tuned by switching between multiple feed antennas. This technique is simple to implement but does not provide continuous steering. Moreover, multi-feed architecture can reduce aperture efficiency. Element tuning techniques may involve tuning individual array elements using a tunable phase shifting mechanism. The tunable phase shifting system can be implemented using micro-electromechanical switches, p-type/intrinsic/n-type (PIN) diodes, varactors, and tunable materials. Cost, complexity of fabrication, and reliability issues are challenges in adopting these approaches. In medium to large sized arrays, hundreds to thousands of elements may be integrated to form a radiating aperture. Each element may be appropriately tuned and biased to make a collimated beam. Further, direct current isolation (e.g., radio frequency chokes) are typically used for each radiating element. These factors may increase the cost and the complexity and may also impact the design flexibility. Bias lines may also add losses that may deteriorate the radiation efficiency and generate unwanted heat to be dissipated. Another way to tune elements in a tunable phase shifting system is using tunable substrates (e.g., liquid crystals). These approaches may have certain advantages that makes them interesting for particular applications, however they are not widely studied, and further research may be done to determine the effectiveness of these approaches.

SUMMARY

The disclosed reconfigurable antenna may overcome one or more of the above disadvantages associated with typical beam steering techniques. Two-dimensional displacement of a feed-horn can be used with reflecting and transmitting apertures for beam steering. The disclosed system may include a passive metamaterial based transmit-array antenna where multiple reconfigurable beams can be formed by 2-dimensional displacement of the feed antenna relative to the transmit-array aperture. The 2-dimensional movement of the feed horns may steer the beams in both the elevation plane and the azimuth plane. The feed horns may be placed over the radiating aperture and robotic arms can be employed to move the feedhorns independently.

In an embodiment, a system includes a meta-surface including multiple unit cells arranged along the meta-surface, where each unit cell includes a resonating structure, and where structural parameters of each unit cell vary along the meta-surface. The system further includes a first active feed unit directed toward the meta-surface to generate a first beam, where the first active feed unit is configured to move relative to the meta-surface parallel to a 2-dimensional plane, and where the first beam is steerable by moving the first active feed unit.

In some embodiments, the system includes a second active feed unit directed toward the meta-surface to generate a second beam, where the second active feed unit is configured to move relative to the meta-surface parallel to the 2-dimensional plane, and where the second beam is steerable by moving the second active feed unit. In some embodiments, the system includes one or more additional active feed units directed toward the meta-surface to generate one or more additional beams, where the one or more additional active feed units are configured to move relative to the meta-surface parallel to the 2-dimensional plane, and where the one or more additional beams are steerable by moving the one or more additional active feed units. In some embodiments, the meta-surface is a transmit array. In some embodiments, the system includes a robotic arm, where the first active feed unit is attached to the robotic arm. In some embodiments, each unit cell includes a first circular patch positioned on a first dielectric substrate, a first square patch positioned on a second dielectric substrate, a second square patch positioned on a first side of a third dielectric substrate, and a second circular patch positioned on a second side of the third dielectric substrate. The resonating structure may include the first circular patch, the first square patch, the second circular patch, and the second square patch. In some embodiments, the structural parameters of each cell include a patch length, a patch width, a patch radius, and spacing between each of the first circular patch, the first square patch, the second square patch, the second circular patch, or combinations thereof.

In some embodiments, the system includes one or more additional meta-surfaces including multiple additional unit cells arrange along the one or more additional meta-surfaces, where each additional unit cell includes a resonating structure, where additional structural parameters of each additional unit cell vary along the one or more additional meta-surfaces, and where the one or more additional meta-surfaces are positioned at an angle relative to the meta-surface. In some embodiments, the system includes additional active feed units directed toward the one or more additional meta-surfaces to generate additional beams, where the additional active feed units are configured to move relative to the one or more additional meta-surfaces parallel to additional 2-dimensional planes, where the additional beams are steerable by moving the additional active feed units, and where the additional 2-dimensional planes are positioned at an angle relative to the 2-dimensional plane.

In an embodiment, a device includes a transmit array panel including multiple unit cells arranged along a surface, where each unit cell includes a resonating structure, where structural parameters of each unit cell vary along the surface, and where each unit cell includes a first circular patch positioned on a first dielectric substrate, a first square patch positioned on a second dielectric substrate, a second square patch positioned on a first side of a third dielectric substrate, and a second circular patch positioned on a second side of the third dielectric substrate, where the resonating structure includes the first circular patch, the first square patch, the second circular patch, and the second square patch.

In some embodiments, the structural parameters include a patch length, a patch width, a patch radius, and spacing between each of the first circular patch, the first square patch, the second square patch, the second circular patch, or combinations thereof. In some embodiments, the device includes one or more additional transmit array panels including multiple additional unit cells arrange along additional surfaces, where each additional unit cell includes a resonating structure, where additional structural parameters of each additional unit cell vary along the surface, and where the one or more additional transmit array panels are positioned at an angle relative to the transmit array panel.

In an embodiment, a method includes forming a meta-surface including multiple unit cells arranged along the meta-surface, where each unit cell includes a resonating structure, and where structural parameters of each unit cell vary along the meta-surface. The method further includes positioning a first active feed unit toward the meta-surface, where the first active feed unit is configured to move relative to the meta-surface parallel to a 2-dimensional plane.

In some embodiments, the method includes positioning a second active feed unit toward the meta-surface, where the second active feed unit is configured to move relative to the meta-surface parallel to the 2-dimensional plane. In some embodiments, the method includes positioning one or more additional active feed units toward the meta-surface, where the one or more additional active feed units are configured to move relative to the meta-surface parallel to the 2-dimensional plane. In some embodiments, the meta-surface is a transmit array. In some embodiments, the method includes attaching the first active feed unit to a robotic arm, where the robotic arm is configured to move the first active feed unit along the 2-dimensional plane. In some embodiments, the method includes, for each of the multiple unit cells, forming a first circular patch positioned on a first dielectric substrate, forming a first square patch positioned on a second dielectric substrate, forming a second square patch positioned on a first side of a third dielectric substrate, and forming a second circular patch positioned on a second side of the third dielectric substrate, where the resonating structure includes the first circular patch, the first square patch, the second circular patch, and the second square patch. In some embodiments, the structural parameters include a patch length, a patch width, a patch radius, and spacing between each of the first circular patch, the first square patch, the second square patch, the second circular patch, or combinations thereof. In some embodiments, the method includes attaching one or more additional meta-surfaces to the meta-surface at an angel to the meta-surface, where the one or more additional meta-surfaces include multiple additional unit cells arrange along the one or more additional meta-surfaces, where each additional unit cell includes a resonating structure, where additional structural parameters of each additional unit cell vary along the one or more additional meta-surfaces.

Figure 1:
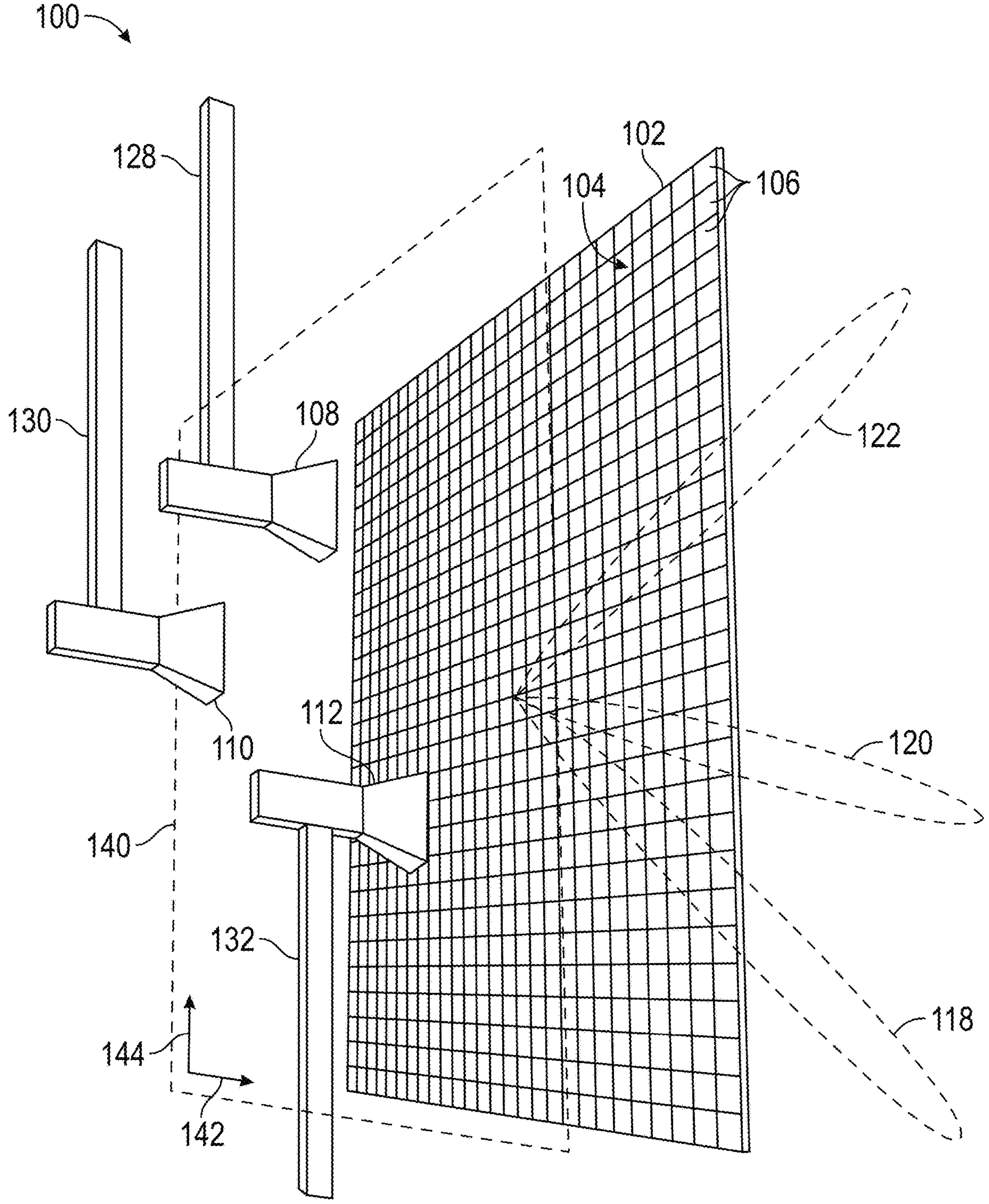
FIG. 1 is a perspective view of an embodiment of a reconfigurable antenna system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, a perspective view of an embodiment of a reconfigurable antenna system 100 is depicted. The system 100 may include a meta-surface 102. The meta-surface 102 may include multiple unit cells 106 arranged along the meta-surface 102. For clarity only three of the unit cells 106 are numbered in FIG. 1. However, each of the squares drawn along the meta-surface 102 may be interpreted as unit cells 106. Although not depicted in FIG. 1, each of the multiple unit cells 106 may include a resonating structure. Structural parameters associated with the resonating structure may vary for each of the multiple unit cells 106 along the meta-surface 102. As shown in FIG. 1, the multiple unit cells 106 may be arranged along a plane 104. The multiple unit cells 106 are further described herein with respect to following FIGS.

The system 100 may include a first active feed unit 108 directed toward the meta-surface 102 to generate a first beam 118, a second active feed unit 110 directed toward the meta-surface 102 to generate a second beam 120, and one or more additional active feed units 112 to generate one or more additional beams 122. For clarity, the one or more additional active feed units 112 are depicted as a single active feed unit. However, the depicted single active feed unit may be interpreted to represent multiple active feed units. It should be noted that due to the perspective view of FIG. 1, the active feed units 108, 110, 112 may appear to be at different distances from the meta-surface 102. However, each of the active feed units 108, 110, 112 may actually be positioned along a 2-dimensional plane 140 and are positioned an equal distance from the meta-surface 102.

The first active feed unit 108 may be attached to a first robotic arm 128. The second active feed unit 110 may be attached to a second robotic arm 130. The one or more additional active feed units 112 may attached to one or more additional robotic arms 132. The first robotic arm 128, the second robotic arm 130, and the one or more additional robotic arms 132 may be configured to move the first active feed unit 108, the second active feed unit 110, and the one or more additional active feed units 112 relative to the meta-surface 102. The movement of each of the first active feed unit 108, the second active feed unit 110, and the one or more additional active feed units 112 may be parallel to a 2-dimensional plane 140. The 2-dimensional plane 140 may extend along an x-axis 142 and a y-axis 144.

During operation, the first beam 118 may be steerable by moving the first active feed unit 108. The second beam 120 may be steerable by moving the second active feed unit 110. The one or more additional beams 122 may be steerable by moving the one or more additional active feed units 112. This is due to the variation of the structural parameters associated with the resonating structures of the multiple unit cells 106. In plane movement of the first active feed unit 108, the second active feed unit 110, and the one or more additional active feed units 112 within the 2-dimensional plane 140 along the x/y axis may scan the first beam 118, the second beam 120, and the one or more additional beams 122 from about −40° to +40° in an elevation plane. Movement of the first active feed unit 108, the second active feed unit 110, and the one or more additional active feed units 112 within the 2-dimensional plane 140 along the x-y axis may steer the first beam 118, the second beam 120, and the one or more additional beams 122 in a full 360° in an azimuth plane.

The system 100 may address the shortcomings of conventional electronically scanned antenna arrays. It may enable the development of cost effective and high-power capable antennas array. By moving the first active feed unit 108, the second active feed unit 110, and the one or more additional active feed units 112, rather than, for example, the meta-surface 102, the system 100 may avoid fault prone rotary joints or placing the transmit-array panel on a moving platform and simplifies the mechanical setup. Further, the system 100 does not involve active components within the meta-surface 102 and may not suffer from non-linearity issues, losses by radio frequency components, and thermal heating issues faced by conventional electronically scanned antennas. The meta-surface may be fabricated on a printed circuit board, which makes the design simple and light weight. For example, the overall weight of the system 100 may be less than 1.0 kilogram. The system 100 may have better scanning performance than other mechanical beam-scanning transmit-array antenna solutions demonstrated to date.

Figure 2:
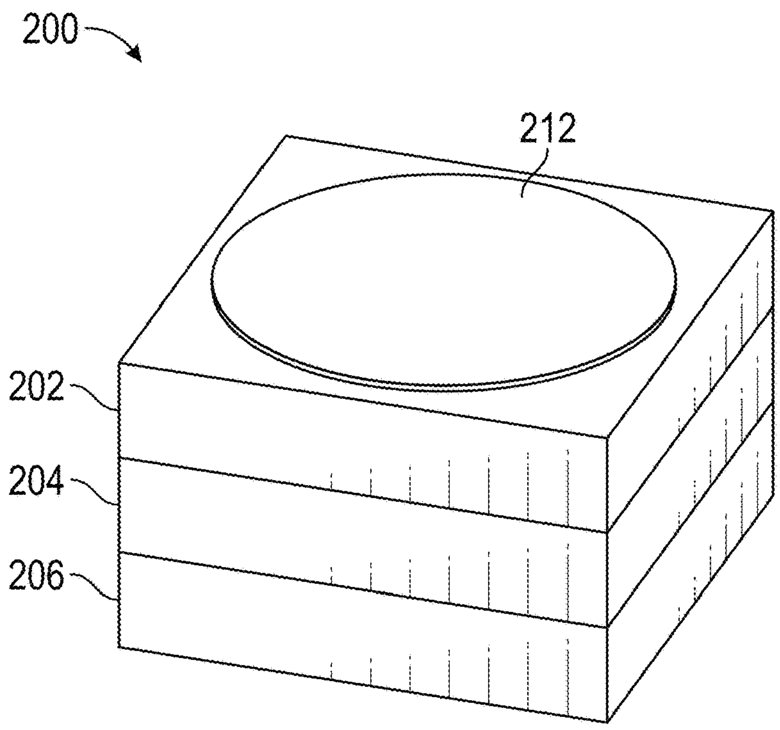
FIG. 2 is a perspective view of an embodiment of a unit cell for use with a reconfigurable antenna system.

Referring to FIG. 2, a perspective view of an embodiment of a unit cell 200 for use with a reconfigurable antenna system is depicted. For example, the unit cell 200 may correspond to one or more of the multiple unit cells 106 of FIG. 1.

The unit cell 200 may include a first dielectric substrate 202, a second dielectric substrate 204, and a third dielectric substrate 206. As shown in FIG. 2, a first circular patch 212 may be positioned on the first dielectric substrate 202. It should be noted that each of the multiple unit cells 106 may be formed on a shared set of substrates rather than each unit cell having its own set of substrates as shown in FIG. 2. In other words, portions of multiple unit cells may be formed on each of the first dielectric substrate 202, the second dielectric substrate 204, and the third dielectric substrate 206.

Figure 3:
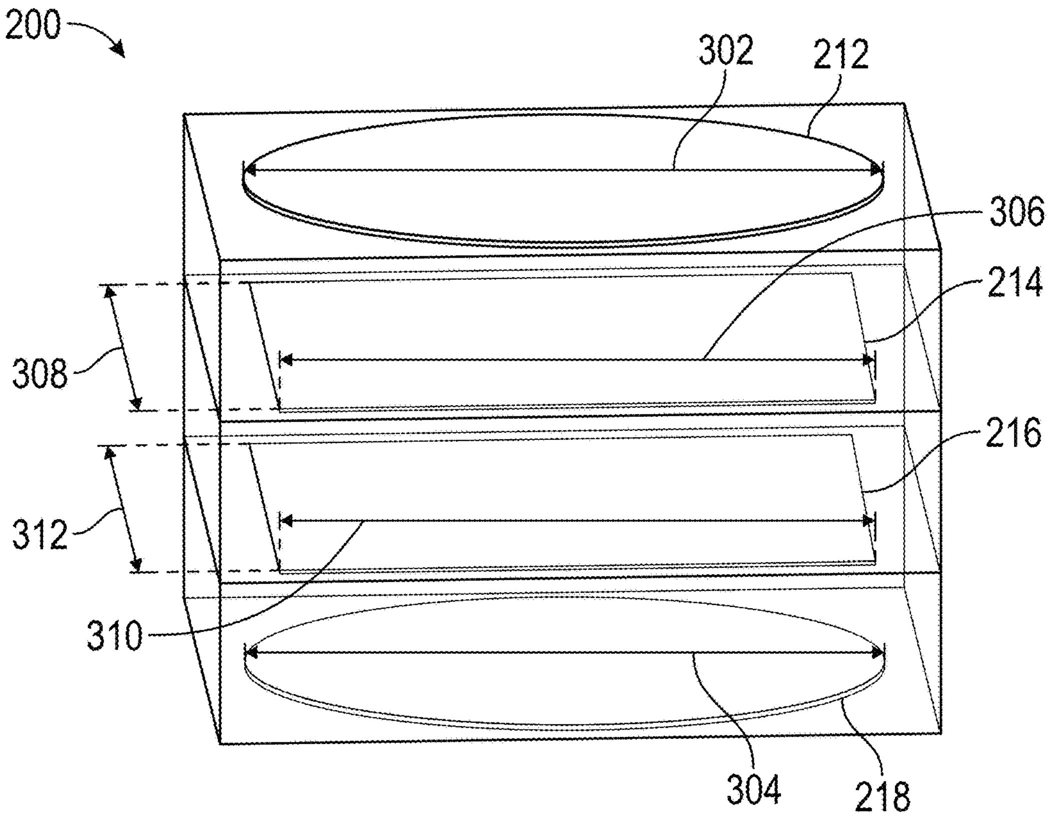
FIG. 3 is an exploded view of an embodiment of the unit cell for use with the reconfigurable antenna system.
Figure 4:
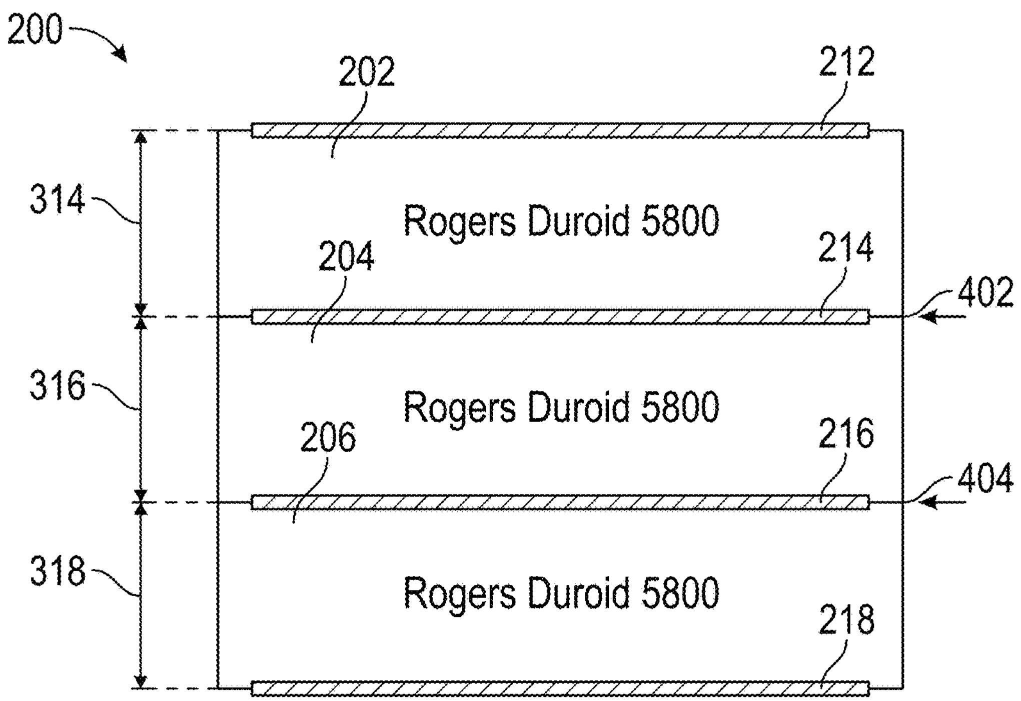
FIG. 4 is a sectional diagram of an embodiment of the unit cell for use with the reconfigurable antenna system.

Referring to FIG. 3, an exploded view of the unit cell 200 is depicted. In addition to the first circular patch 212, the unit cell 200 may include a first square patch 214, a second square patch 216, and a second circular patch 218. Referring to FIG. 4, a sectional view of the unit cell 200 is depicted. A first adhesive layer 402 may bind the first dielectric substrate 202 and the second dielectric substrate 204. A second adhesive layer 404 may bind the second dielectric substrate 204 and the third dielectric substrate 206.

Together, the first circular patch 212, the first square patch 214, the second square patch 216, and the second circular patch 218 may define a resonating structure capable of reflecting or transmitting a radio frequency signal. By adjusting structural parameters of the unit cell 200, a frequency response of the unit cell 200 may also be adjusted. The structural parameters may include a patch length and width. For example, referring to FIG. 3, the first square patch 214 may have a length 306 and a width 308 and the second square patch 216 may have a length 310 and a width 312. Making adjustments of the lengths 306, 310 and the widths 308, 312 may alter the phase response of the unit cell 200.

The first circular patch 212 may have a diameter 302 and the second circular patch 218 may have a diameter 304. Adjusting the diameters 302, 304 may alter the phase response of the unit cell 200. With reference to FIG. 4, the first circular patch 212 and the first square patch 214 may be separated by a first distance 314. The first square patch 214 and the second square patch 216 may be separated by a distance 316. The second square patch 216 and the second circular patch 218 may be separated by a distance 318. Altering the distances 314, 316, 318 may alter the phase and frequency response of the unit cell 200.

In a particular, non-limiting embodiment, the first dielectric substrate 202, the second dielectric substrate 204, and the third dielectric substrate 206 may include Rogers Duroid 5880. The adhesive layers 402, 404 may include bonding layers to bond the first dielectric substrate 202, the second dielectric substrate 204, and the third dielectric substrate 206 together.

Figure 5:
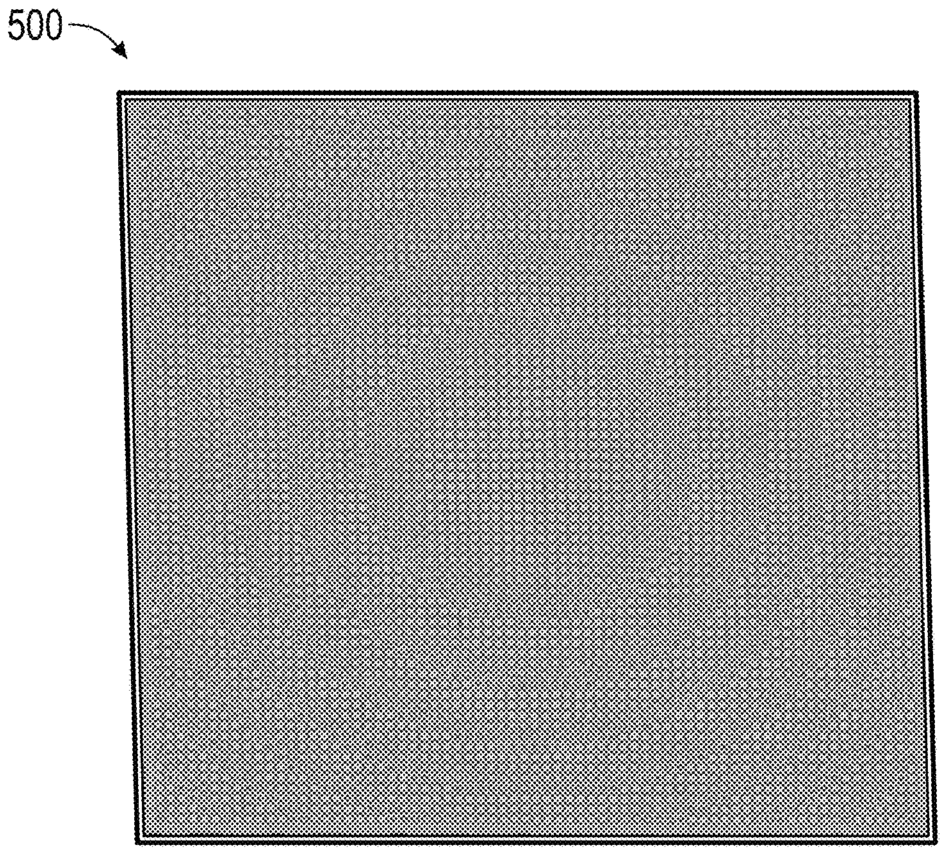
FIG. 5 is a perspective view of a non-limiting embodiment of a meta-surface.

Referring to FIG. 5, a non-limiting embodiment of a meta-surface 500 is depicted. It can be seen that at least a top layer of the resonation structure of each of the unit cells varies in a designed patter across the meta-surface 500. To add extra flexibility in the design, the designed meta-surface 500 may be made polarization insensitive by choosing a unit cell pattern which can support both linear and circular polarization (without distorting the polarization). It should be noted that the meta-surface 500 is for example purposes only and may be scaled in size and number of unit cells.

Beam focusing ideally has a full 360° phase agility. The desired phase tunability may be achieved by phase variation on variable sized elements/resonators. In the particular embodiment of meta-surface 500 of FIG. 5, to obtain the desired phase range, a comprehensive parametric study of the individual unit cells was performed. This resulted in wide phase range and linear phase characteristics with low losses. The parametric study was carried out by varying the structural parameters (e.g., patch length and width, radius of patch and spacing between respective layers). Dimensions of unit cell pattern and their corresponding transmission coefficient values were stored in a database to generate a phase distribution for a uni-focal transmit array. It should be noted that further research has suggested that a multi-focal distribution may reduce a scan loss of the meta-surface 500.

Figure 6:
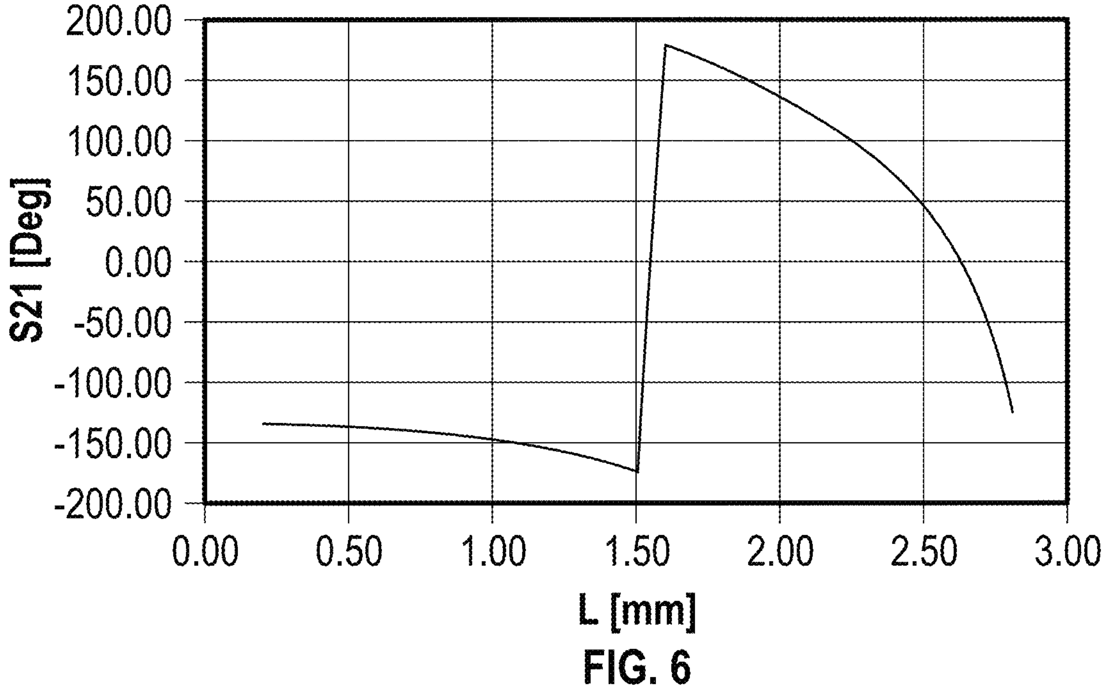
FIG. 6 is a graph depicting a unit cell transmission coefficient in an $S_{21}$ phase for an example embodiment of a reconfigurable antenna system.
Figure 7:
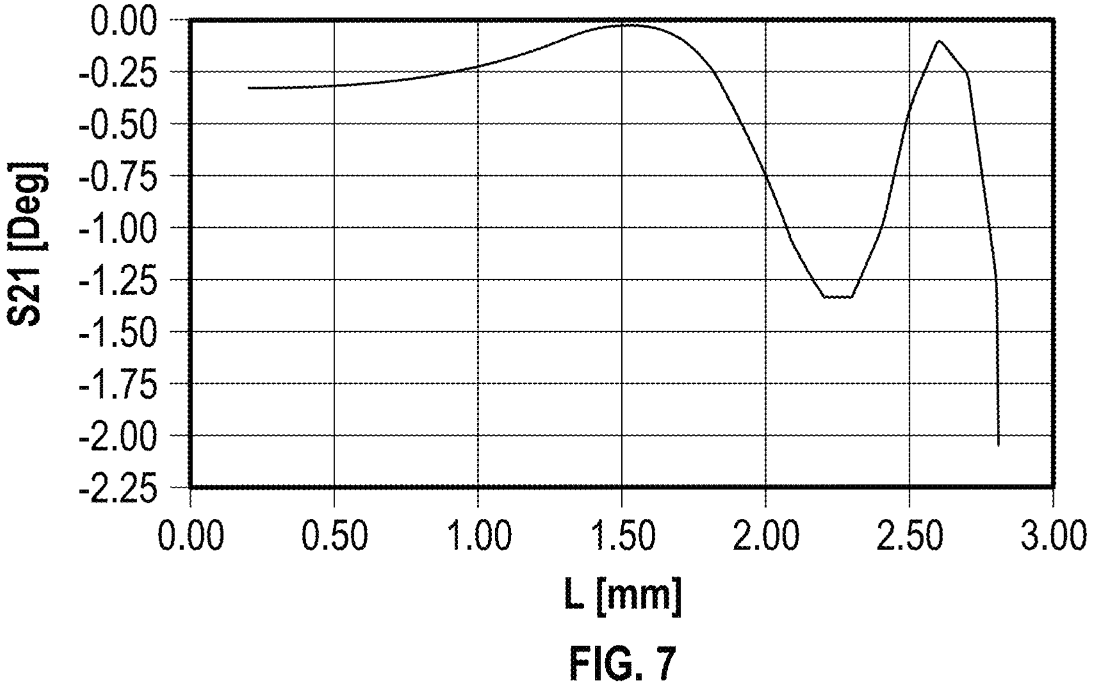
FIG. 7 is a graph depicting a unit cell transmission coefficient in an $S_{21}$ magnitude for an example embodiment of a reconfigurable antenna system.

Referring to FIGS. 6 and 7, a transmission coefficient phase and amplitude of the designed meta-surface 500 of FIG. 5 is depicted. FIGS. 6 and 7 are descriptive of an example system and are not limiting. FIG. 6 depicts a unit cell transmission coefficient in an $S_{21}$ phase. The coefficient phase falls between approximately −200° and 200° as a length of a unit cell (e.g., the unit cell 200) increases between approximately 0.20 mm and 2.70 mm. FIG. 7 depicts a unit cell transmission coefficient in an $S_{21}$ magnitude. The coefficient magnitude increases from about −0.25 to about zero as a length of a unit cell increases from about 0.20 mm to about 1.50 mm, then decreases from about zero to about −1.25 as the length increases from about 1.50 mm to about 2.25 mm, then increases from about −1.25 to about zero as the length increases from about 2.25 mm to about 2.6 mm, then falls off at around 2.70 mm.

Figure 8A:
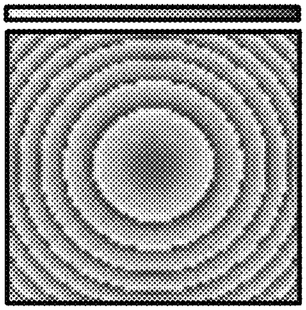
FIGS. 8A-8I are graphs depicting a phase distribution of an example embodiment of a reconfigurable antenna system for beam scanning from 0° to 40°.
Figure 8B:
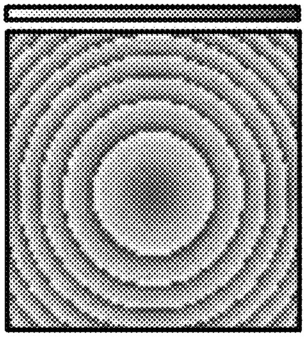
Figure 8C:
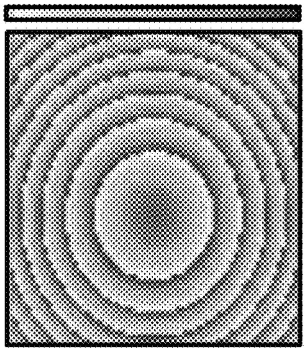
Figure 8D:
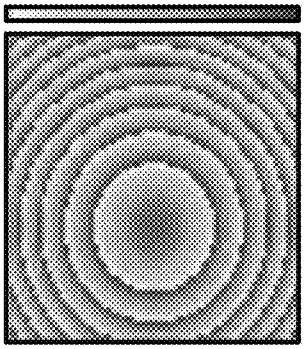
Figure 8E:
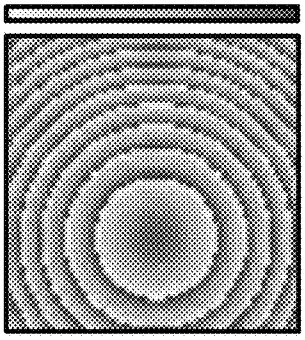
Figure 8F:
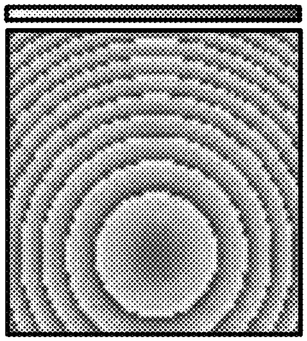
Figure 8G:
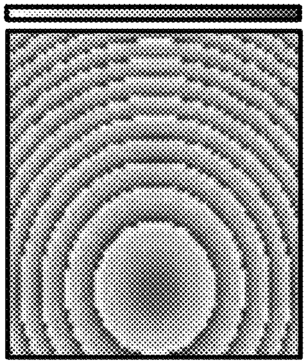
Figure 8H:
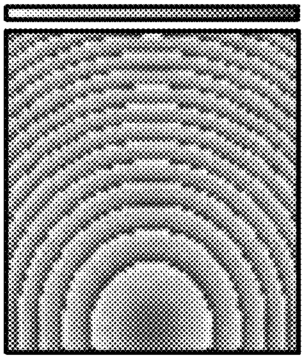
Figure 8I:
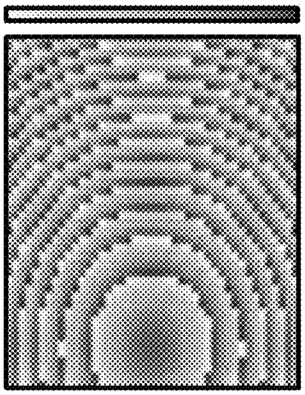

Referring to FIGS. 8A-8I, a phase distribution of an example embodiment of a reconfigurable antenna system (e.g., the system 100) for beam scanning from 0° to 40°. To generate the FIGS. 8A-8I, an active feed unit (e.g., the active feed unit 108) is placed at a focal length to diameter ratio (F/D) of 0.5 relative to a meta-surface (e.g., the meta-surface 102). Beam steering of −40° to +40° was achieved with a feed displacement of +/−80 mm from an origin. A peak measured gain is 34.85 dB. FIG. 8A depicts the phase distribution at boresight. FIG. 8B depicts the phase distribution at 5°. FIG. 8C depicts the phase distribution at 10°. FIG. 8D depicts the phase distribution at 15°. FIG. 8E depicts the phase distribution at 20°. FIG. 8F depicts the phase distribution at 25°. FIG. 8G depicts the phase distribution at 30°. FIG. 8H depicts the phase distribution at 35°. FIG. 8I depicts the phase distribution at 40°. FIGS. 8A-8I show good beam scanning capabilities associated with an embodiment of the system 100. FIGS. 8A-8I relate to an example embodiment and are not limiting. Other possibilities exist.

Figure 9:
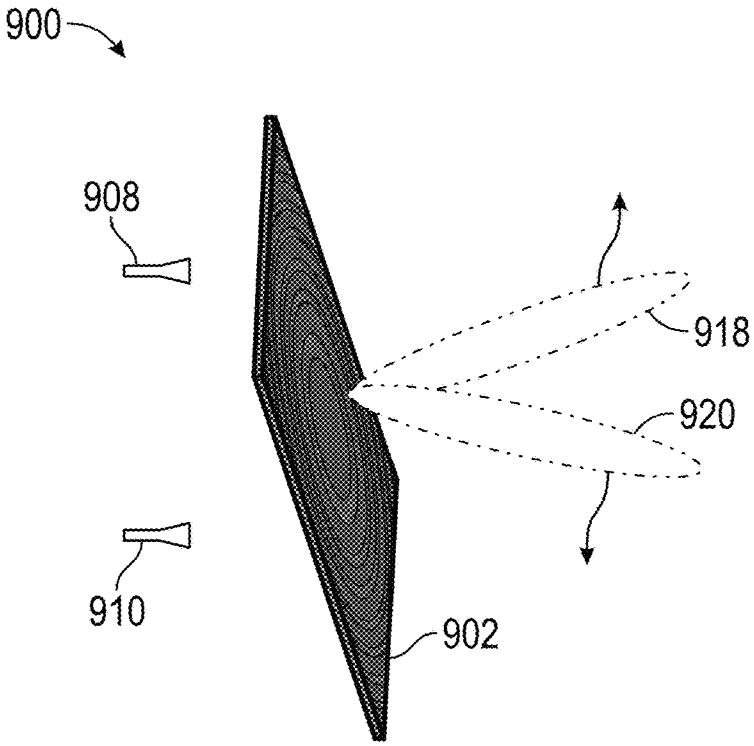
FIG. 9 is a perspective view of an example embodiment of a reconfigurable antenna system producing two steerable beams.
Figure 10:
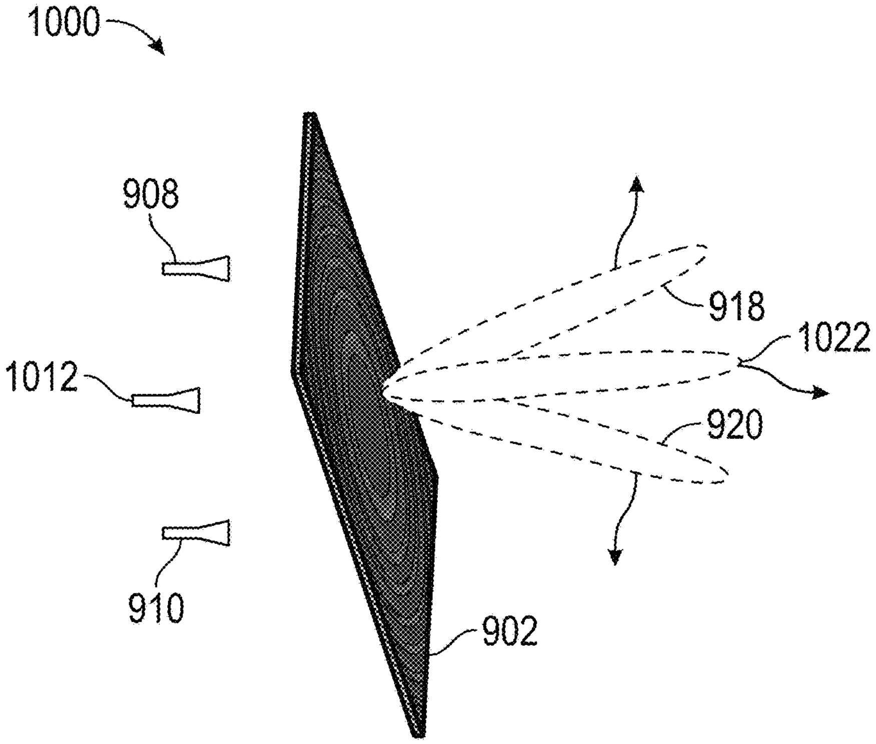
FIG. 10 is a perspective view of an example embodiment of a reconfigurable antenna system producing three steerable beams.
Figure 11:
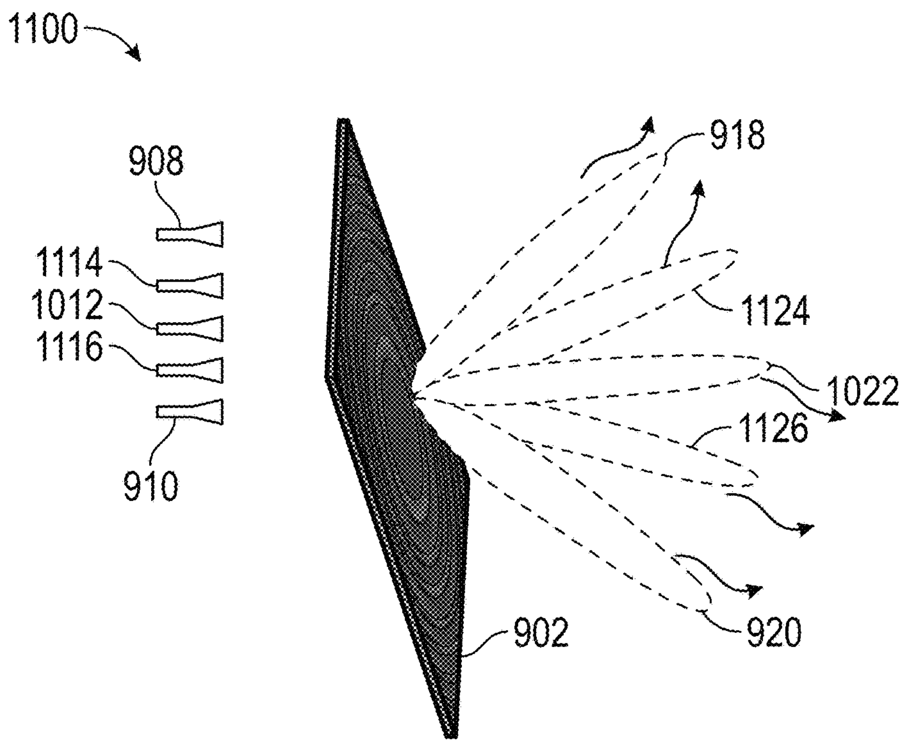
FIG. 11 is a perspective view of an example embodiment of a reconfigurable antenna system producing five steerable beams.

Referring to FIGS. 9, 10, and 11, the beam steering concept described herein may be used for reconfigurable MIMO systems. Referring to FIG. 9, a reconfigurable antenna system 900 as described herein may include a meta-surface 902, a first active feed unit 908, and a second active feed unit 910. The system 900 may be used to generate a first beam 918 and a second beam 920 that are independently steerable by moving the first active feed unit 908 and the second active feed unit 910 relative to the meta-surface 902.

Referring to FIG. 10, a reconfigurable antenna system 1000 as described herein may include a meta-surface 902, a first active feed unit 908, a second active feed unit 910, and a third active feed unit 1012. The system 1000 may be used to generate a first beam 918, a second beam 920, and a third beam 1022 that are independently steerable by moving the first active feed unit 908, the second active feed unit 910, and the third active feed unit 1012 relative to the meta-surface 902.

Referring to FIG. 11, a reconfigurable antenna system 1100 as described herein may include a meta-surface 902, a first active feed unit 908, a second active feed unit 910, a third active feed unit 1012, a fourth active feed unit 1114, and a fifth active feed unit 1116. The system 1100 may be used to generate a first beam 918, a second beam 920, a third beam 1022, a fourth beam 1124, and a fifth beam 1126 that are independently steerable by moving the first active feed unit 908, the second active feed unit 910, the third active feed unit 1012, the fourth active feed unit 1114, and the fifth active feed unit 1116 relative to the meta-surface 902.

Although FIG. 11 depicts 5 independent beams, more beams may be generated by the addition of active feed units. The proposed beam steering mechanism when combined in MIMO configuration can result in a significant increase in degrees of freedom compared to other MIMO configurations having fewer independently steerable beams.

Figure 12:
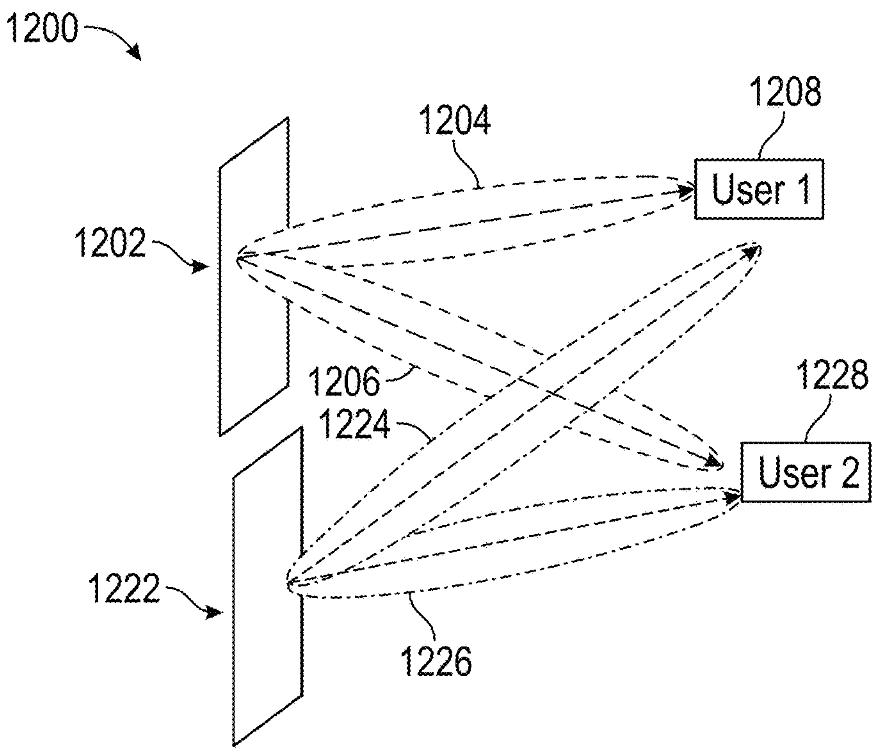
FIG. 12 is a perspective view of example embodiments of reconfigurable antenna systems configured for multiple-in-multiple-out (MIMO) communication.

Referring to FIG. 12, a MIMO communication system 1200 is depicted. The MIMO communication system 1200 may include a first reconfigurable antenna system 1202 as described herein and a second reconfigurable antenna system 1222 as described herein. It should be noted that for simplicity, the reconfigurable antenna systems 1202, 1222 are depicted simply as rectangles rather than showing individual components (e.g., active feed units) of the reconfigurable antenna systems 1202, 1222. The first reconfigurable antenna system 1202 may use a first beam 1204 to communicate information to a first user 1208. The second reconfigurable antenna system 1222 may use a second beam 1224 to communicate information to the first user 1208. Likewise, the first reconfigurable antenna system 1202 may use a third beam 1206 to communicate additional information to the second user 1208. The second reconfigurable antenna system 1222 may use a fourth beam 1226 to communicate additional information to the second user 1228. In this way, the system 1200 may implement MIMO communication with the users 1208, 1228. MIMO system equipped with the disclose antenna design can provide an extra degree of freedom as compared to the systems that have static antennas. This additional degree of freedom helps the wireless system to overcome high path loss, channel sparsity, and significant shadowing at high frequencies. The disclosed antenna design can be used in MIMO systems for both spatial diversity and spatial multiplexing.

Figure 13C:
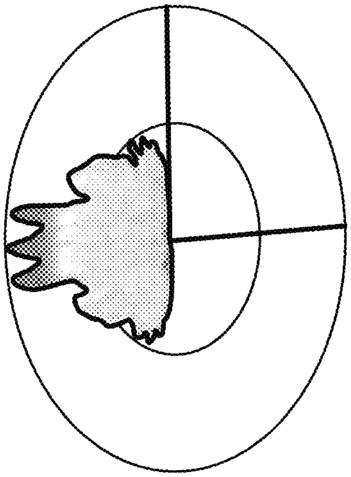
FIGS. 13A-13E are graphical models of radiation patterns associated with example embodiments of reconfigurable antenna systems including one, two, three, four, and five steerable beams.
Figure 13E:
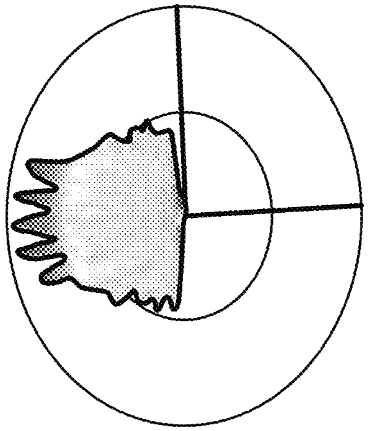
Figure 13B:
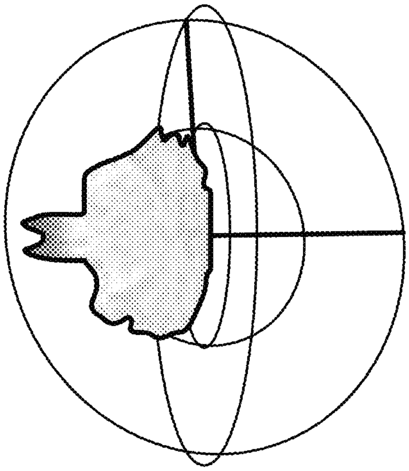
Figure 13D:
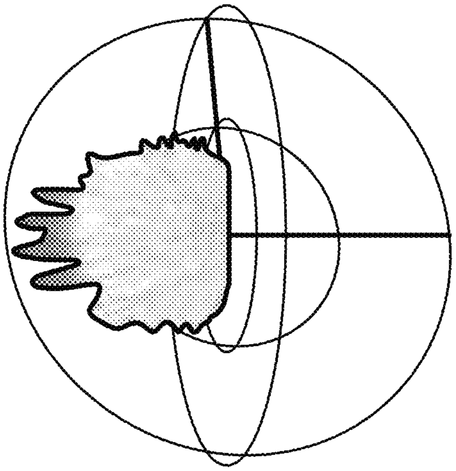
Figure 13A:
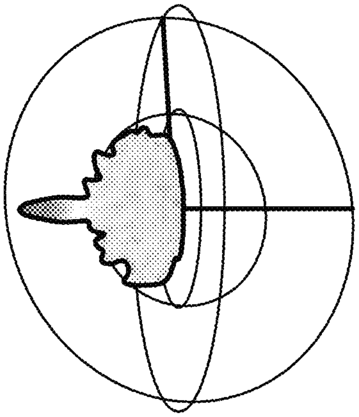

Referring to FIG. 13A-13E, radiation patterns associated with an example embodiment of a reconfigurable antenna system as describe herein are depicted. FIG. 13A depicts a radiation pattern having one beam associated with one active feed unit. FIG. 13B depicts a radiation pattern having two beams associated with two active feed unit. FIG. 13C depicts a radiation pattern having three beams associated with three active feed unit. FIG. 13D depicts a radiation pattern having four beams associated with four active feed unit. FIG. 13E depicts a radiation pattern having five beams associated with five active feed unit.

The described reconfigurable antenna can produce both linearly and circularly polarized beams. With linearly polarized feed, emitted beams may have linear polarization. Likewise, with circularly polarized feed, the describe reconfigurable antenna may produce circularly polarized beams. Hence the described reconfigurable antenna may provide the flexibility to support both circular and linear polarization. Polarization of an emitted beam is the same as polarization of incident wave.

Figure 14:
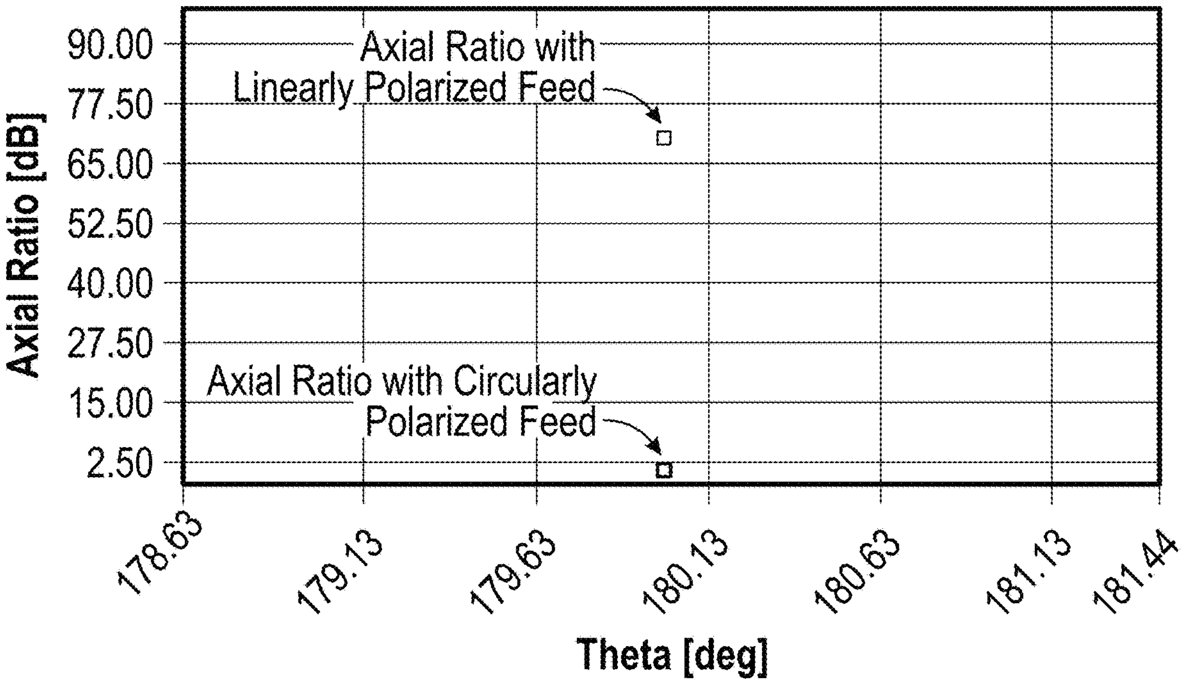
FIG. 14 is a graph depicting an axial ratio plot associated with a linearly polarized feed and a circularly polarized feed.

Referring to FIG. 14, an axial ratio plot associated with a linearly polarized feed and a circularly polarized feed is depicted. FIG. 14 shows the axial ratio plot for the case where a transmit-array is integrated with linearly and circularly polarized feed. For example, an axial ratio for bore-sight beam is below 3 dB with circularly polarized feed and above 60 dB with linearly polarized feeds. Therefore, the described design is an excellent candidate for the applications where polarization diversity is required.

Figure 15:
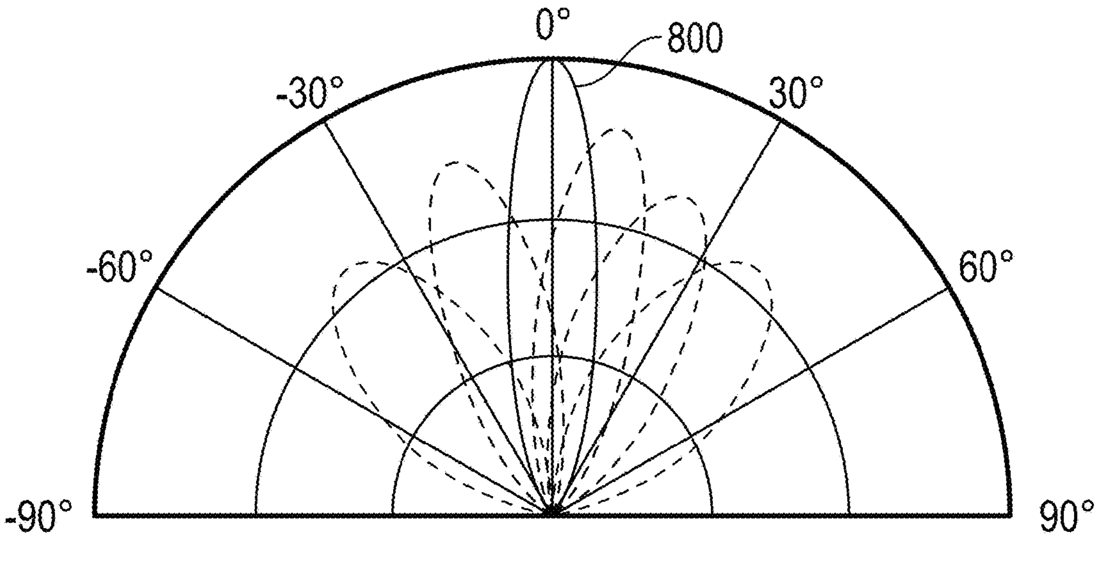
FIG. 15 is a graph depicting one steerable beam from −40° to 40°.

For an example embodiment, a measured 3 dB bandwidth is from 29 GHz to 32 GHz. Scan loss of more than 7 dB was initially observed for +/−40° scan range. To optimize the scan loss, a bifocal phase distribution may be adopted, where a phase distribution is averaged for two different focal points instead of single focal point. This may reduce the phase error that occurs due to feed displacement and hence scan loss can be reduced. Scan loss remained below 3 dB after applying bifocal phase distribution Referring to FIG. 15, a graph depicts one steerable beam from −40° to 40° as may be performed by the system 100. The beams drawn in dotted lines indicate possible steering positions. Although the FIGS. depict discrete beam positions, in reality the beams are continuously steerable and the beam positions are not limited to those shown in dotted lines. Using the system 100, beam steering of −40° to +40° may be performed with scan loss below 3 dB for one beam.

Figure 16:
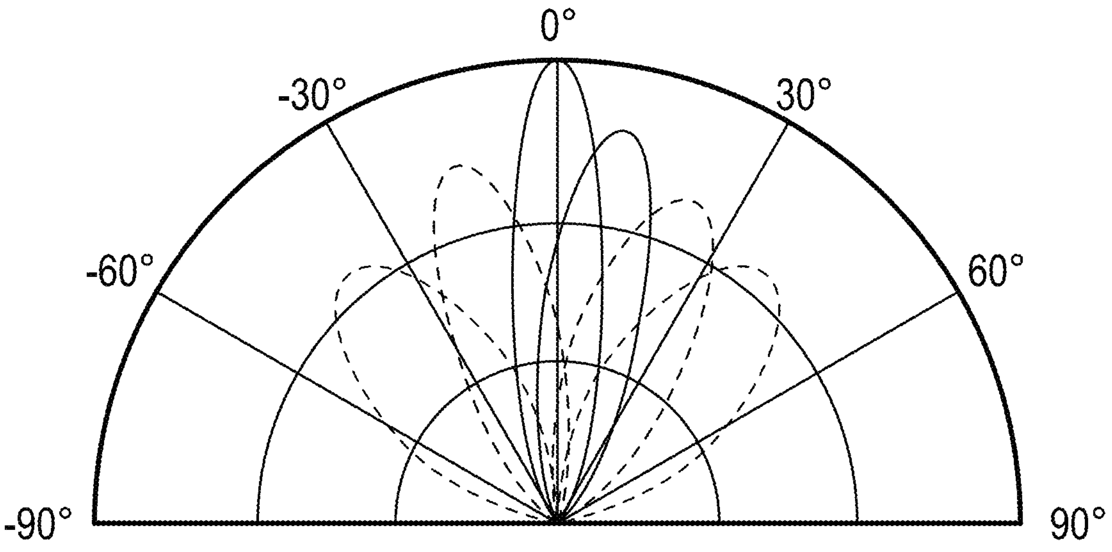
FIG. 16 is a graph depicting two steerable beams from −40° to 40°.

Referring to FIG. 16, a graph depicts two steerable beams from −40° to 40° as may be performed by the system 100. As with FIG. 15, the beams drawn in dotted lines indicate possible steering positions. Although the FIGS. depict discrete beam positions, in reality the beams are continuously steerable and the beam positions are not limited to those shown in dotted lines. Using the system 100, beam steering of −40° to +40° may be performed with scan loss below 3 dB for two beams.

Figure 17:
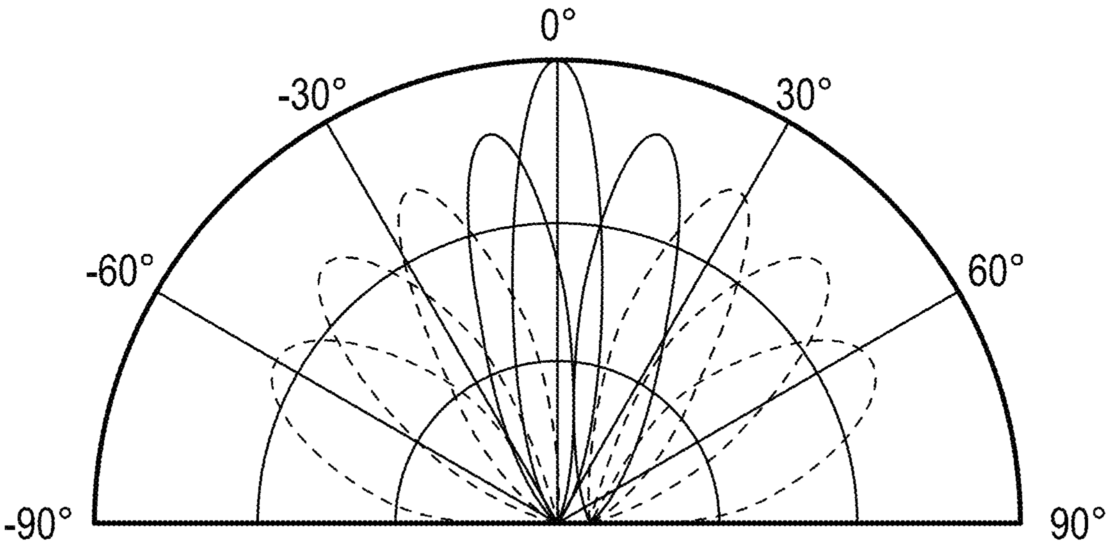
FIG. 17 is a graph depicting three steerable beams from −40° to 40°.

Referring to FIG. 17, a graph depicts three steerable beams from −40° to 40° as may be performed by the system 100. As with FIGS. 16 and 17, the beams drawn in dotted lines indicate possible steering positions. Although the FIGS. depict discrete beam positions, in reality the beams are continuously steerable and the beam positions are not limited to those shown in dotted lines. Further, although the beams in FIG. 17 appear to be steerable from −60° to 60°, in practice the beams may actually be steered from −40° to 40°. Using the system 100, beam steering of −40° to +40° may be performed with scan loss below 3 dB for three beams. Other possibilities also exist.

Figure 18:
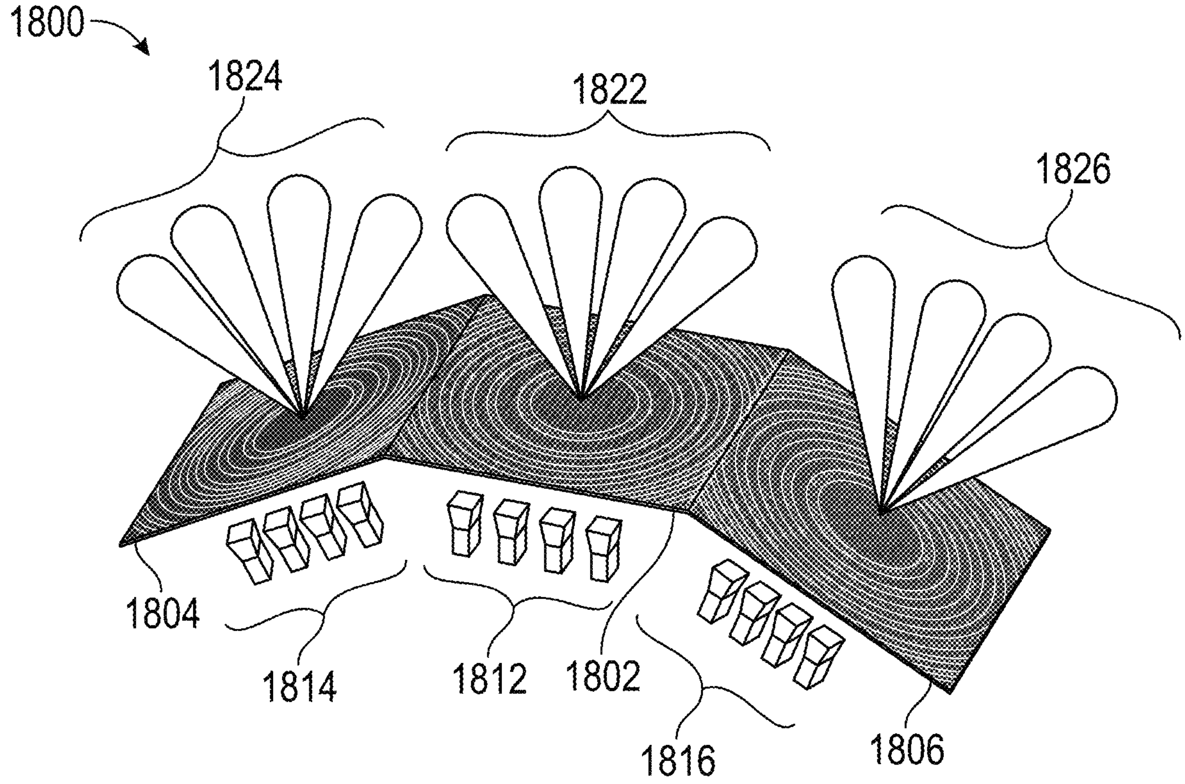
FIG. 18 is a perspective view of a reconfigurable antenna system having three meta-surfaces.

Referring to FIG. 18, a perspective view of an embodiment of a reconfigurable antenna system 1800 is depicted. The system 1800 may include a first meta-surface 1802, a second meta-surface 1804, and a third meta-surface 1806. Each of the meta-surfaces 1802, 1804, 1806 may be similar in construction and design to the meta-surface 102 of FIG. 1. As such, each of the meta-surfaces 1802, 1804, 1806 may include multiple unit cells arrange along the meta-surfaces 1802, 1804, 1806. Each unit cell may include resonating structure as described previously herein. The structural parameters of each unit cell may vary along the meta-surfaces 1802, 1804, 1806. The meta-surfaces 1802, 1804, 1806 may be positioned at angles relative to each other.

A first set of active feed units 1812 may be directed toward the first meta-surface 1802. A second set of active feed units 1814 may be directed toward the second meta-surface 1804. A third set of active feed units 1816 may be directed toward the third meta-surface 1806. As described with reference to the active feed units 108, 110, 112 of system 100, each of the sets of active feed units 1812, 1814, 1816, may be configured to move relative to the meta-surfaces 1802, 1804, 1806 parallel to respective 2-dimensional planes associated their respective meta-surfaces 1802, 1804, 1806.

In this way, the first set of active feed units 1812 may generate a first set of beams 1822. The second set of active feed units 1814 may generate a second set of beams 1824. The third set of active feed units 1816 may generate a third set of beams 1826. While each meta-surface may enable beam scanning from −40° to 40° individually, when put together at an angle, the meta-surfaces 1802, 1804, 1806 may enable beam scanning from −80° to 80° together. These values are for a particular implementation. Other possibilities may also exist for scan range.

The system 1800 may extend the steering capacity of transmit-array beam transmission relative to the system 100 by effectively dividing a meta-surface into a multi-panel transmit array, where each panel is rotated by an angle with reference to a central planar panel. Dividing the meta-surface into three meta-surfaces 1802, 1804, 1806 may reduce phase errors (which may occur with feed displacement). Thus, the scan range may be increased.

The design of the system 1800 may increases the scan range to +/−80° and may also provide strong control over side lobe levels. For example, the side lobe of beam scanning with feed displacement increases as a scan angle increases. The system 1800 may limit the side lobe levels as the field of view of individual panels are +/−40°. This represents an advantage as high gain wide-angle beam scanning with low side lobe level can be realized. For example, low side lobe may be helpful to meet requirements for Federal Communications Commission (FCC) licensing.

Figure 19:
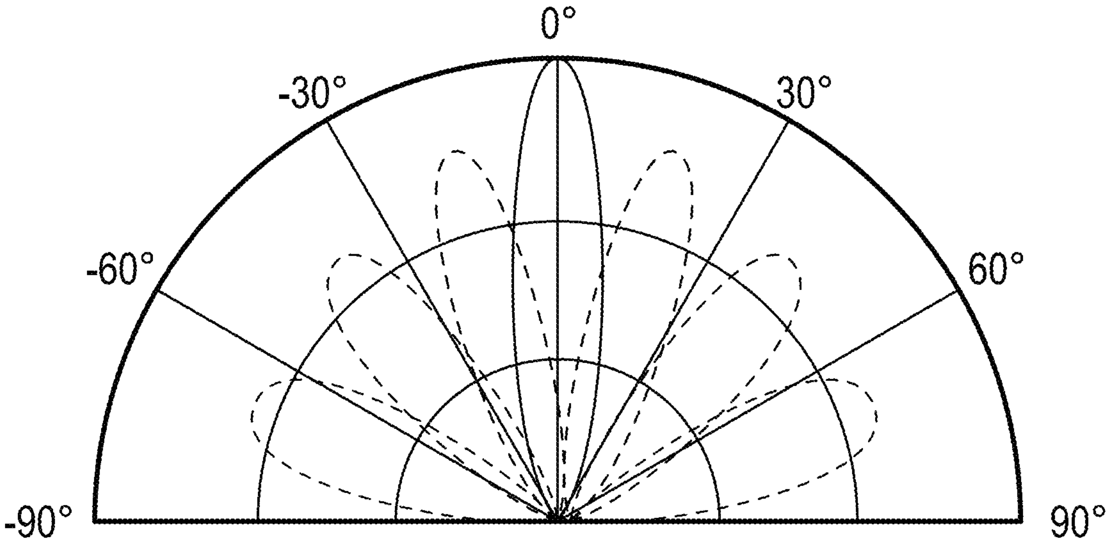
FIG. 19 is a graph depicting one steerable beam from −80° to 80°.

Referring to FIG. 19, a graph depicts one steerable beam from −80° to 80° as may be performed by the system 1800. It should be noted that, although FIG. 19 depicts only one beam, multiple beams may be generated using the system 1800. Using the system 1800, beam steering of −80° to +80° may be performed with scan loss below 3 dB. Further, because of the surface flatness and lack of electronic components all three panels can be folded for easy deployment.

Figure 20:
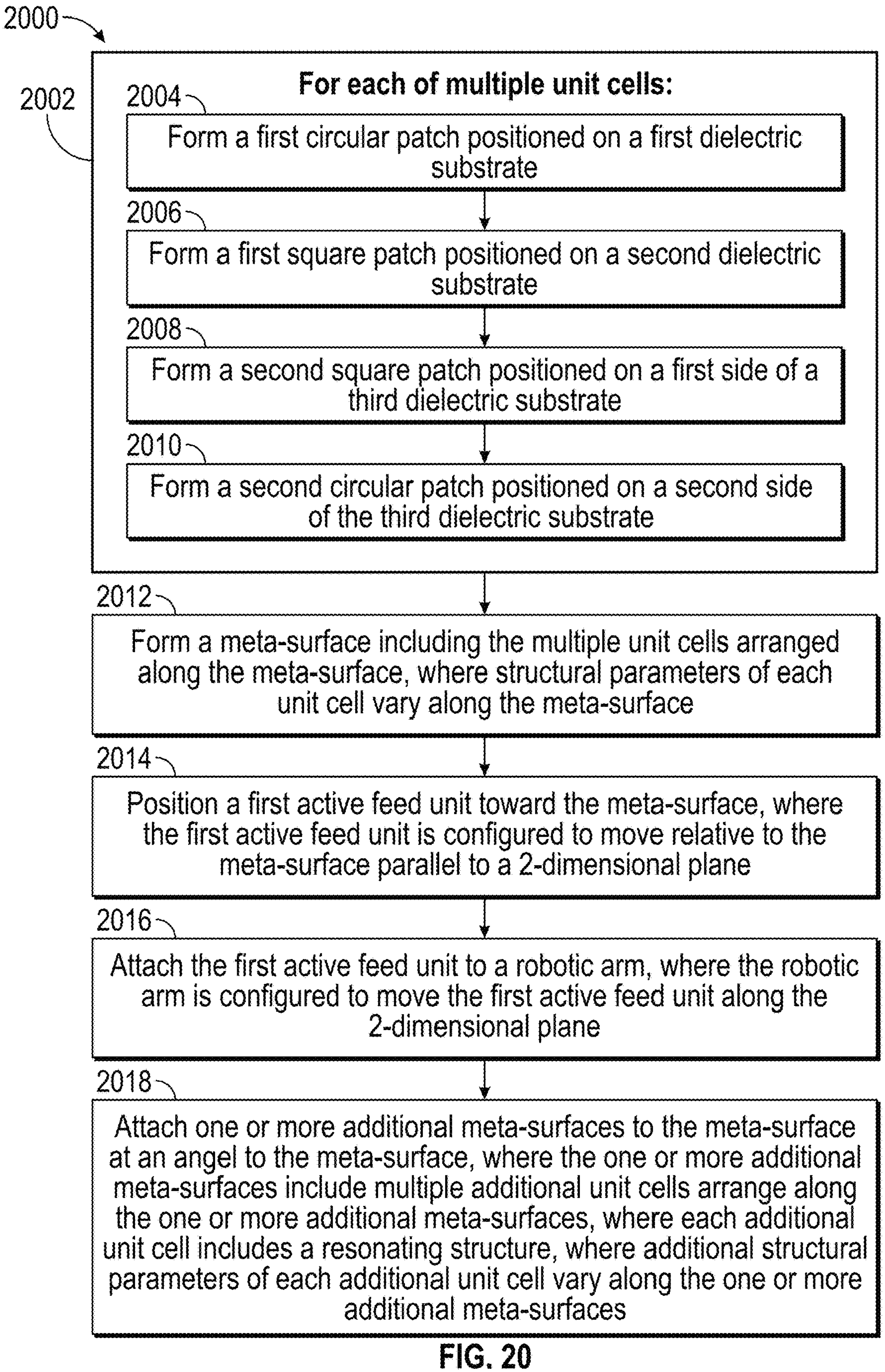
FIG. 20 is a flow diagram depicting a method for forming a reconfigurable antenna system.

Referring to FIG. 20, a method 2000 for forming a reconfigurable antenna system is depicted. The method 2000 may include, at 2002, for each of multiple unit cells, forming a first circular patch positioned on a first dielectric substrate, at 2004, forming a first square patch positioned on a second dielectric substrate, at 2006, forming a second square patch positioned on a first side of a third dielectric substrate, at 2008, and forming a second circular patch positioned on a second side of the third dielectric substrate, at 2010.

The method 2000 may further include forming a meta-surface including multiple unit cells arranged along the meta-surface, where each unit cell includes a resonating structure, and where structural parameters of each unit cell vary along the meta-surface, at 2012.

The method 2000 may also include positioning a first active feed unit toward the meta-surface, where the first active feed unit is configured to move relative to the meta-surface parallel to a 2-dimensional plane, at 2014.

The method 2000 may include attaching the first active feed unit to a robotic arm, where the robotic arm is configured to move the first active feed unit along the 2-dimensional plane, at 2016.

The method 2000 may also include attaching one or more additional meta-surfaces to the meta-surface at an angel to the meta-surface, where the one or more additional meta-surfaces include multiple additional unit cells arrange along the one or more additional meta-surfaces, where each additional unit cell includes a resonating structure, where additional structural parameters of each additional unit cell vary along the one or more additional meta-surfaces, at 2018.

The disclosed approach to beam steering may support multi-beam patterns to support MIMO implementation. The disclosed approach can be easily realized since beam steering occur only by feed displacement. Beam steering of 360° in the azimuth plane and −40 to +40 in the elevation plane may been achieved using this approach. Further, the steering range may be increased to +/−80° in elevation by implementing a multi-facet transmit array. As an additional benefit, the designed surface can be folded for easy deployment. Other advantages may exist. These values are for a particular implementation. Other possibilities may also exist for gain and scan range.

Although various embodiments have been shown and described, the present disclosure is not so limited and will be understood to include all such modifications and variations as would be apparent to one skilled in the art.

What is claimed is:

1. A system comprising:

a meta-surface including multiple unit cells arranged along the meta-surface, wherein each unit cell includes a resonating structure, and wherein structural parameters of each unit cell vary along the meta-surface; and a first active feed unit directed toward the meta-surface to generate a first beam, wherein the first active feed unit is configured to move relative to the multiple unit cells arranged along the meta-surface parallel to a 2-dimensional plane, and wherein the first beam is steerable by moving the first active feed unit.

2. The system of claim 1, further comprising a second active feed unit directed toward the meta-surface to generate a second beam, wherein the second active feed unit is configured to move relative to the meta-surface parallel to the 2-dimensional plane, and wherein the second beam is steerable by moving the second active feed unit.

3. The system of claim 1, further comprising one or more additional active feed units directed toward the meta-surface to generate one or more additional beams, wherein the one or more additional active feed units are configured to move relative to the meta-surface parallel to the 2-dimensional plane, and wherein the one or more additional beams are steerable by moving the one or more additional active feed units.

4. The system of claim 1, wherein the meta-surface is a transmit array.

5. The system of claim 1, further comprising a robotic arm, wherein the first active feed unit is attached to the robotic arm.

6. The system of claim 1, wherein each unit cell comprises:

a first circular patch positioned on a first dielectric substrate;

a first square patch positioned on a second dielectric substrate;

a second square patch positioned on a first side of a third dielectric substrate; and a second circular patch positioned on a second side of the third dielectric substrate, wherein the resonating structure includes the first circular patch, the first square patch, the second circular patch, and the second square patch.

7. The system of claim 6, wherein the structural parameters include a patch length, a patch width, a patch radius, and spacing between each of the first circular patch, the first square patch, the second square patch, the second circular patch, or combinations thereof.

8. The system of claim 1, further comprising one or more additional meta-surfaces including multiple additional unit cells arrange along the one or more additional meta-surfaces, wherein each additional unit cell includes a resonating structure, wherein additional structural parameters of each additional unit cell vary along the one or more additional meta-surfaces, and wherein the one or more additional meta-surfaces are positioned at an angle relative to the meta-surface.

9. The system of claim 8, further comprising:

additional active feed units directed toward the one or more additional meta-surfaces to generate additional beams, wherein the additional active feed units are configured to move relative to the one or more additional meta-surfaces parallel to additional 2-dimensional planes, wherein the additional beams are steerable by moving the additional active feed units, and wherein the additional 2-dimensional planes are positioned at an angle relative to the 2-dimensional plane.

10. A device comprising:

a transmit array panel including multiple unit cells arranged along a surface, wherein each unit cell includes a resonating structure, and wherein structural parameters of each unit cell vary along the surface, wherein each unit cell comprises:

a first circular patch positioned on a first dielectric substrate;

a first square patch positioned on a second dielectric substrate;

a second square patch positioned on a first side of a third dielectric substrate; and a second circular patch positioned on a second side of the third dielectric substrate, wherein the resonating structure includes the first circular patch, the first square patch, the second circular patch, and the second square patch.

11. The device of claim 10, wherein the structural parameters include a patch length, a patch width, a patch radius, and spacing between each of the first circular patch, the first square patch, the second square patch, the second circular patch, or combinations thereof.

12. The device of claim 10, further comprising one or more additional transmit array panels including multiple additional unit cells arrange along additional surfaces, wherein each additional unit cell includes a resonating structure, wherein additional structural parameters of each additional unit cell vary along the surface, and wherein the one or more additional transmit array panels are positioned at an angle relative to the transmit array panel.

13. A method comprising:

forming a meta-surface including multiple unit cells arranged along the meta-surface, wherein each unit cell includes a resonating structure, and wherein structural parameters of each unit cell vary along the meta-surface; and positioning a first active feed unit toward the meta-surface, wherein the first active feed unit is configured to move relative to the meta-surface parallel to a 2-dimensional plane.

14. The method of claim 13, further comprising positioning a second active feed unit toward the meta-surface, wherein the second active feed unit is configured to move relative to the meta-surface parallel to the 2-dimensional plane.

15. The method of claim 13, further comprising positioning one or more additional active feed units toward the meta-surface, wherein the one or more additional active feed units are configured to move relative to the meta-surface parallel to the 2-dimensional plane.

16. The method of claim 13, wherein the meta-surface is a transmit array.

17. The method of claim 13, further comprising attaching the first active feed unit to a robotic arm, wherein the robotic arm is configured to move the first active feed unit along the 2-dimensional plane.

18. The method of claim 13, further comprising, for each of the multiple unit cells:

forming a first circular patch positioned on a first dielectric substrate;

forming a first square patch positioned on a second dielectric substrate;

forming a second square patch positioned on a first side of a third dielectric substrate; and forming a second circular patch positioned on a second side of the third dielectric substrate, wherein the resonating structure includes the first circular patch, the first square patch, the second circular patch, and the second square patch.

19. The method of claim 18, wherein the structural parameters include a patch length, a patch width, a patch radius, and spacing between each of the first circular patch, the first square patch, the second square patch, the second circular patch, or combinations thereof.

20. The method of claim 13, further comprising attaching one or more additional meta-surfaces to the meta-surface at an angel to the meta-surface, wherein the one or more additional meta-surfaces include multiple additional unit cells arranged along the one or more additional meta-surfaces, wherein each additional unit cell includes a resonating structure, wherein additional structural parameters of each additional unit cell vary along the one or more additional meta-surfaces.

* * * * *